(12) United States Patent
Zhang

(10) Patent No.: US 8,420,934 B2
(45) Date of Patent: Apr. 16, 2013

(54) CROSSING BUS SUPPORT APPARATUS, CONNECTORS, SYSTEMS, AND ASSEMBLIES AND METHODS OF INSTALLING SAME

(75) Inventor: Fan Zhang, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 287 days.

(21) Appl. No.: 12/898,784

(22) Filed: Oct. 6, 2010

(65) Prior Publication Data

US 2011/0083872 A1 Apr. 14, 2011

Related U.S. Application Data

(60) Provisional application No. 61/249,830, filed on Oct. 8, 2009.

(51) Int. Cl.
*H02G 5/00* (2006.01)
*H05K 5/00* (2006.01)

(52) U.S. Cl.
USPC ............ 174/68.2; 174/50; 361/611; 361/648

(58) Field of Classification Search ............ 174/50, 174/68.2, 70 B–72 B, 88 B, 99 B, 129 B, 174/133 B, 149 B; 439/251, 296, 949; 361/611, 361/624, 633, 637, 638, 640, 648–650, 775; 29/592.1; 403/345
See application file for complete search history.

(56) References Cited

U.S. PATENT DOCUMENTS

| | | | | |
|---|---|---|---|---|
| 2,318,859 A * | 5/1943 | Huguelet | ............... | 248/68.1 |
| 3,018,320 A * | 1/1962 | Rowe | ............... | 174/99 B |
| 3,315,132 A * | 4/1967 | Lucas | ............... | 361/829 |
| 4,128,918 A | 12/1978 | Wenk | | |
| 4,146,285 A * | 3/1979 | Cook | ............... | 439/213 |
| 4,819,309 A * | 4/1989 | Behymer | ............... | 24/586.11 |
| 6,664,478 B2 * | 12/2003 | Mohan et al. | ............... | 174/149 B |
| 6,870,103 B1 * | 3/2005 | Wiant et al. | ............... | 174/68.2 |
| 7,285,724 B2 * | 10/2007 | Buettner | ............... | 174/70 B |
| 7,488,218 B2 | 2/2009 | Dixon | | |

* cited by examiner

*Primary Examiner* — Angel R Estrada
*Assistant Examiner* — Dimary Lopez

(57) ABSTRACT

Embodiments provide a crossing bus support apparatus and connectors thereof. The crossing bus support apparatus includes a body structure having a first portion with a plurality of phase bus slots, the phase bus slots adapted to receive a plurality of crossing buses, a first connector on a first end having dual protrusions each protrusion having an interlockable feature; and a second connector on a second end having dual protrusions each protrusion having an interlockable feature. The crossing bus support apparatus may be used in pairs to capture crossing buses into the phase bus slots. Systems, assemblies, connectors, and methods of installing and utilizing the crossing bus support apparatus are provided, as are other aspects.

19 Claims, 12 Drawing Sheets

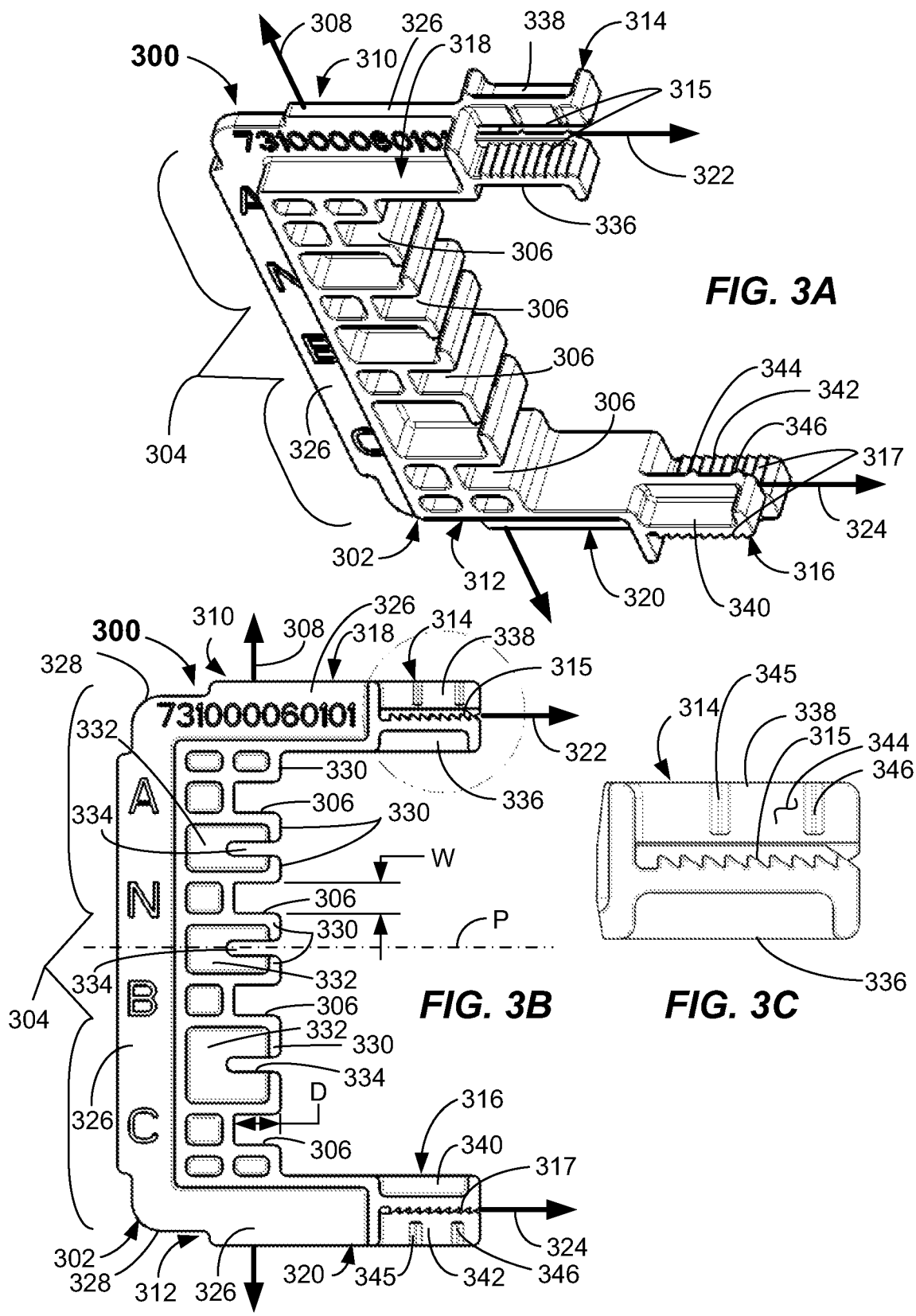

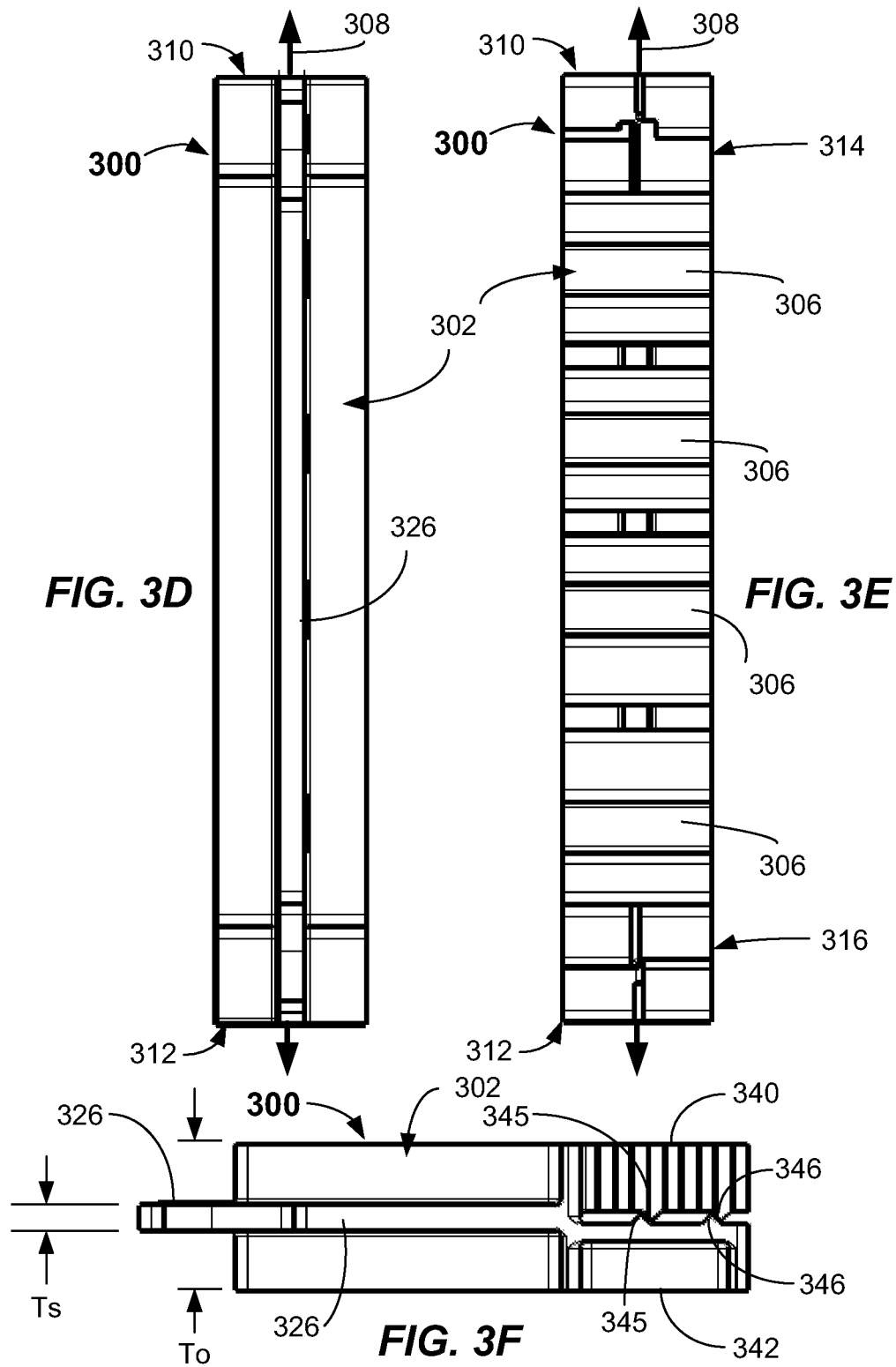

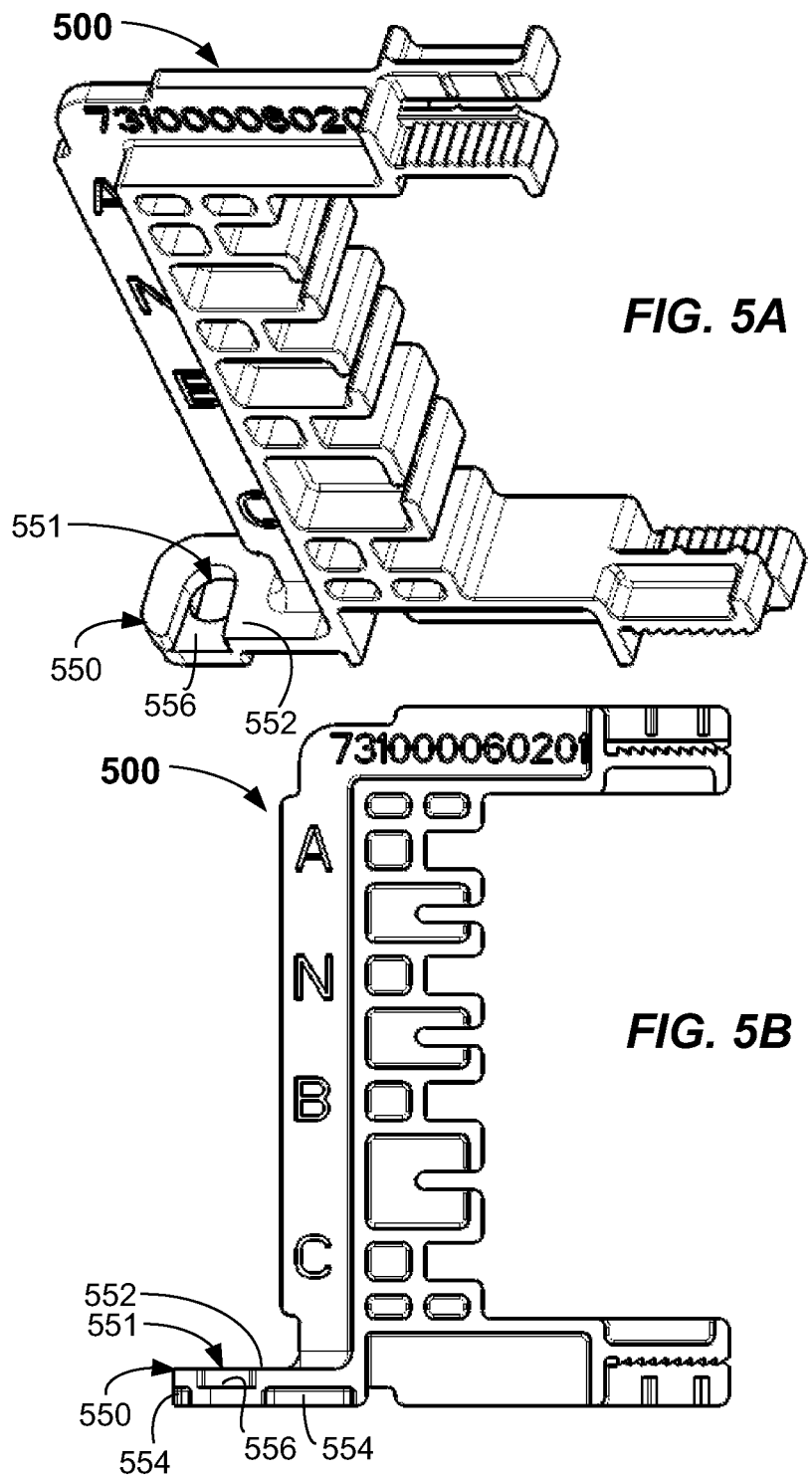

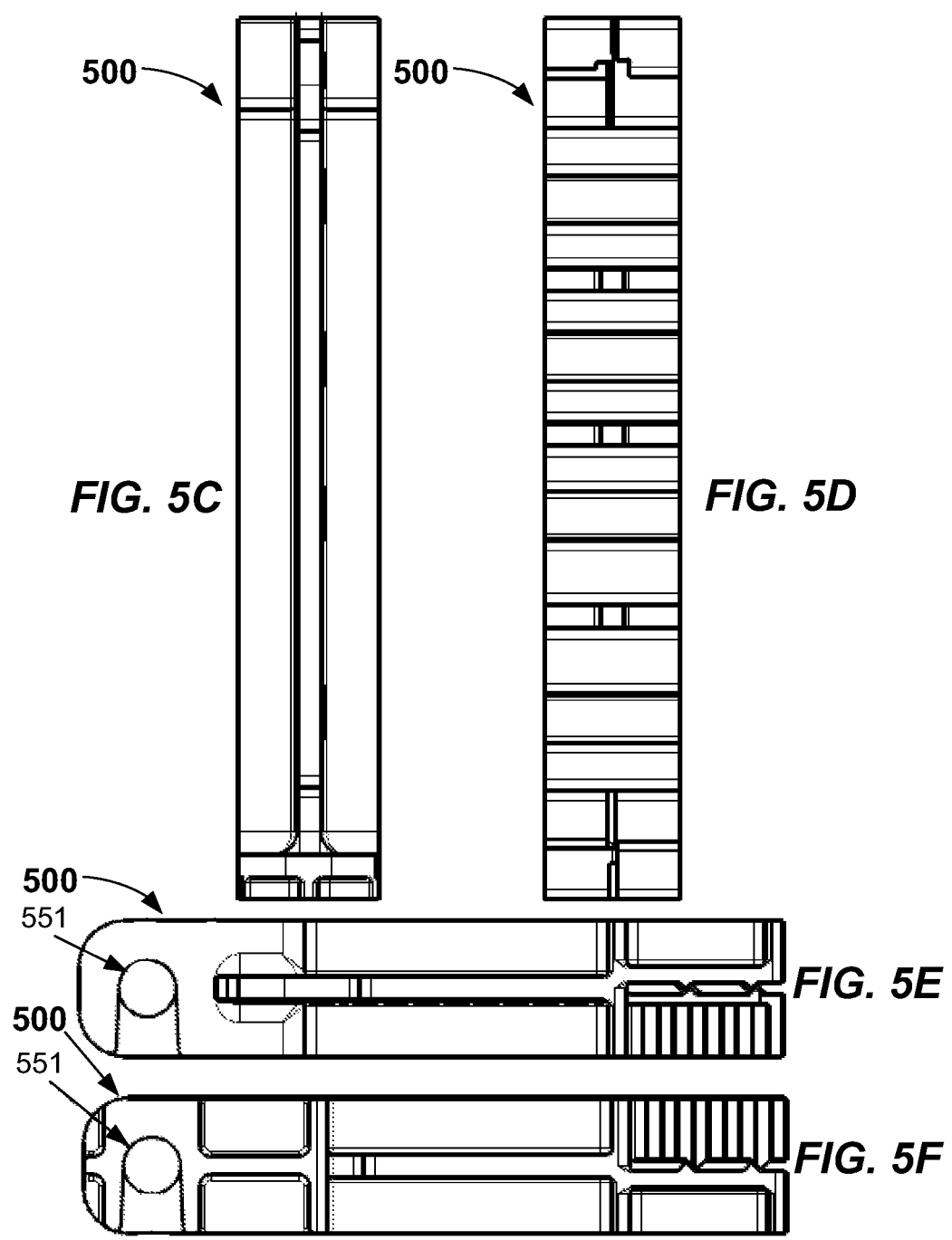

CROSSING BUS SUPPORT APPARATUS, CONNECTORS, SYSTEMS, AND ASSEMBLIES AND METHODS OF INSTALLING SAME

RELATED APPLICATIONS

This application claims priority to U.S. Provisional Application Ser. No. 61/249,830 entitled "CROSSING BUS SUPPORT" filed on Oct. 8, 2009, the disclosure of which is hereby incorporated by reference in its entirety herein.

FIELD OF THE INVENTION

The present invention relates generally to electrical enclosure boxes including crossing buses, and crossing bus supports.

BACKGROUND OF THE INVENTION

Within electrical enclosure boxes (e.g., a panel boxes), various components such as circuit breakers, fusible switches, meters, disconnects, etc. may be electrically connected to crossing buses. Such crossing buses may include buses for A-phase (A), Neutral (N), B-phase (B), and/or Common (C) and may pass or cross between a first part and a second part of the enclosure box. The crossing buses may be configured to run in parallel in order of A, N, B and/or C, for example. Such crossing buses may be included within various Power Mod™ products available from Siemens of Alpharetta, Ga.

It is important feature that such systems including crossing buses and crossing bus supports are rigorous enough to withstand significant forces produced during short circuit interruption events. In particular, adequate spacing should be maintained between the buses and the enclosure box, and also between the crossing buses themselves. Moreover, such crossing bus supports and crossing buses should be relatively easy to install within the enclosure box.

Accordingly, there is a long-felt and unmet need for a rigid crossing bus assembly, that maintains desired spacing between the crossing buses and other components, and which is easily assembled in mass production.

SUMMARY OF THE INVENTION

In a first aspect, a crossing bus support apparatus is provided. The crossing bus support apparatus includes a body structure including a first portion having a plurality of phase bus slots arranged along a first direction extending from a first end to a second end, the phase bus slots adapted to receive a plurality of crossing buses; a first connector on the first end having a first protrusion and a second protrusion each having interlockable features; and a second connector on the second end having a third protrusion and a fourth protrusion each having interlockable features.

In another aspect, a crossing bus support assembly is provided. The crossing bus support assembly includes a first crossing bus support having a body structure including a first portion including a plurality of phase bus slots arranged along a first direction, the phase bus slots adapted to receive a plurality of crossing buses, and second and third portions extending from the first portion along a second direction different than the first direction, each of the second and third portions having a connector with dual projections, each projection including an interlockable feature; and a second crossing bus support having a body structure including a first portion including a plurality of phase bus slots arranged along a first direction, the phase bus slots adapted to receive the plurality of crossing buses, and second and third portions extending from the first portion along a second direction different than the first direction, each of the second and third portions having a connector with dual projections, each projection including an interlockable feature which is adapted to interlock with the interlockable features of the first crossing bus support.

In another aspect, a crossing bus assembly is provided. The crossing bus assembly includes a plurality of crossing buses; and one or more crossing bus support assemblies coupled to the crossing buses, the one or more crossing bus support assembly including interconnected crossing bus supports, wherein each of the crossing bus supports includes a first portion including a plurality of phase bus slots arranged along a first direction, the phase bus slots receiving a side of the plurality of crossing buses, and second and third portions extending from the first portion along directions different than the first direction, each of the second and third portions having a connector with dual projections, each projection including an interlockable feature.

In a system aspect, an electrical system subcomponent is provided. The electrical system subcomponent includes an enclosure box; a plurality of crossing buses provided in the enclosure box; and one or more crossing bus support assemblies coupled to the plurality of crossing buses, the crossing bus support assemblies including interconnected crossing bus support apparatus, and wherein each of the crossing bus support apparatus includes a first portion having a plurality of phase bus slots arranged along a first direction, each of the phase bus slots receiving one of the plurality of crossing buses, and second and third portions extending from the first portion along a direction different than the first direction, each of the second and third portions having a connector with dual projections, each projection including an interlockable feature.

According to a method aspect, a method of installing crossing buses is provided. The method includes providing an enclosure box including an interior portion; providing a plurality of crossing buses in the enclosure box; providing a first crossing bus support apparatus having a plurality of phase bus slots and at least two connectors having dual protrusions each connector including interlockable features; installing the first crossing bus support apparatus onto a first side of the plurality of crossing buses; providing a second crossing bus support having a plurality of phase bus slots and at least two connectors having dual protrusions each connector including interlockable features; installing the second crossing bus support apparatus onto a second side of the plurality of crossing buses; and interlocking the interlockable features of each of the dual protrusions of each connector of the first and second crossing bus supports apparatus to capture the plurality of crossing buses and form a crossing bus assembly.

According to yet another aspect, a connector is provided. The connector includes an object; a body structure coupled to the object; a first protrusion extending from the body structure, the first protrusion including interlocking features formed on a first surface thereof; a second protrusion extending from the body structure alongside of the first protrusion, the second protrusion including interlocking features formed on a second surface opposite the first surface.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The invention is to cover all modifications, equivalents, and alternatives falling within the spirit and scope of the invention.

BRIEF DESCRIPTION OF DRAWINGS

FIG. 3A is a perspective view of a crossing bus support apparatus according to embodiments of the present invention.

FIG. 3B is a side plan view of the crossing bus support apparatus of FIG. 3A.

FIG. 3C is an enlarged plan view of a connector of the crossing bus support apparatus of FIG. 3B.

FIG. 3D is a left end plan view of the crossing bus support apparatus of FIG. 3B.

FIG. 3E is a right end plan view of the crossing bus support apparatus of FIG. 3B.

FIG. 3F is a bottom plan view of the crossing bus support apparatus of FIG. 3B.

FIG. 5A is a perspective view of another crossing bus support apparatus including an extended mounting foot according to embodiments of the present invention.

FIG. 5B is a side plan view of the crossing bus support apparatus of FIG. 5A.

FIG. 5C is a left end plan view of the crossing bus support apparatus of FIG. 5B.

FIG. 5D is a right end plan view of the crossing bus support apparatus of FIG. 5B.

FIG. 5E is a top plan view of the crossing bus support apparatus of FIG. 5B.

FIG. 5F is a bottom plan view of the crossing bus support apparatus of FIG. 5B.

DETAILED DESCRIPTION

Figure 1:
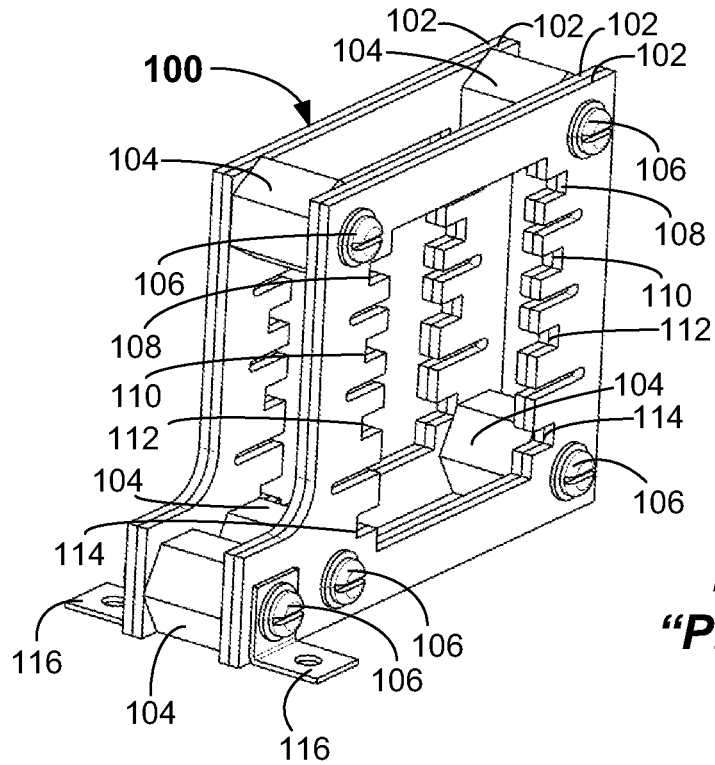
FIG. 1 is a perspective view of a crossing bus support apparatus according to an embodiment of the prior art.
Figure 2:
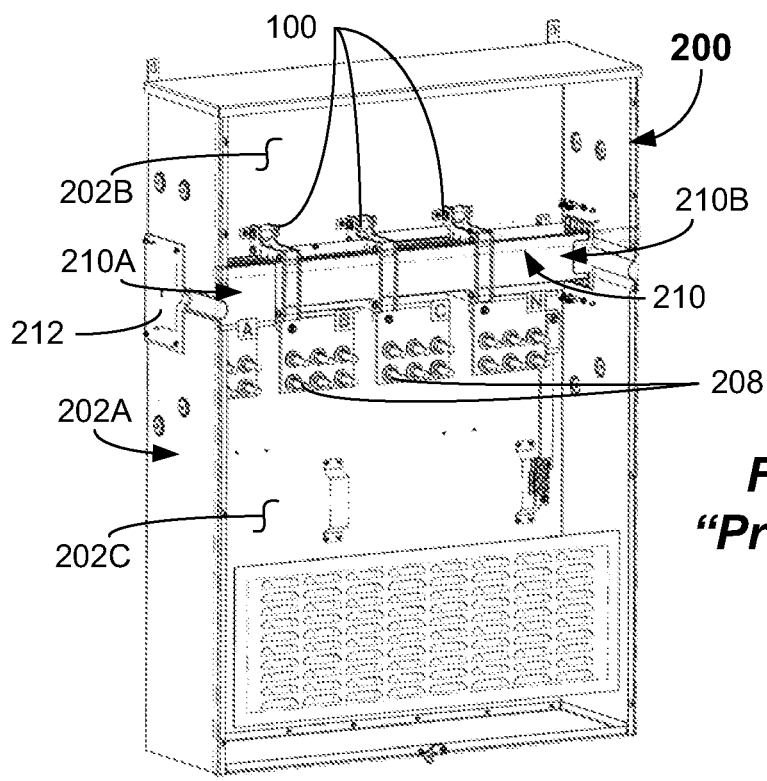
FIG. 2 is a perspective view of several crossing bus support apparatus of FIG. 1 installed in an enclosure box according to an embodiment of the prior art.

Currently, crossing buses may be supported, as best shown in FIGS. 1 and 2, by crossing bus supports 100. The crossing bus supports 100 may include two double layers of plates 102 (e.g., glass reinforced plastic plates) that may be spaced by multiple standoffs 104 and may be fastened together by fasteners 106. The crossing bus supports 100 include phase bus slots 108, 110, 112, and 114 for receiving the respective crossing buses therein. Mounting brackets 116 are used for installing the crossing bar support 100 into an enclosure box.

FIG. 2 illustrates an electrical subassembly 200, such as a Power Mod™ tap box available from Siemens of Alpharetta, Ga. The electrical subassembly 200 includes the enclosure box 202A, a top cover 202B, and a bottom cover 202C (the covers are shown in phantom lines in order to show the interior details of the enclosure box 202A). The electrical subassembly 200 is adapted to receive electrical line power from line terminals (e.g., 208) to the crossing buses 210, and the electrical power is transferred through the crossing buses 210 to service other electrical components (e.g., other enclosure boxes) connected or coupled at either/both ends 210A, 210B of the crossing buses 210. In such enclosure boxes, removable end caps 212 may seal the ends of crossing buses 210 making them weather proof when the end of crossing buses 210 is not connected to other service components (e.g., other enclosure boxes). In the middle of the crossing buses 210 or along the length thereof, multiple crossing bus supports 100 may be mounted to the back surface of enclosure box 202A. The crossing bus supports 100 may reinforce and space the crossing buses 210 so that they may withstand forces generated due to short circuit interruption events.

However, it should be recognized that assembly of such multiple crossing bus supports 100 to the crossing buses 210 may be quite difficult and time consuming. This is because each of the crossing bus supports 100 needs to be installed (e.g., slid) onto the crossing buses 210 from the ends thereof. Each crossing bus 210 must be aligned with and inserted into the slots (108, 110, 112, and 114) of the multiple crossing bus supports 100. This is even more difficult and time consuming for long crossing buses and/or crossing buses with weld joints. The entire assembly must then be installed into the enclosure box 202A, which is difficult in and of itself. Furthermore, the design of the existing bus support 100 is complex, includes multiple pieces, and is time intensive to manufacture and assemble.

In view of the foregoing difficulties, and, in particular, the desire to reduce assembly time for the manufacture of the electrical subassembly 200 including, crossing buses 100, an improved crossing bus support is provided.

Accordingly, the present invention provides a crossing bus support apparatus that may robustly support the crossing buses, yet which is relatively simple to install. The crossing bus support apparatus of the invention is strong enough to withstand significant short circuit interruption events (e.g., 100 kA), and sturdy enough to keep the appropriate electrical spacing between the crossing buses and the adjacent enclosure box. The crossing bus support apparatus also appropriately constrains the crossing buses from moving apart and/or sideways relative to one another. In some embodiments, the crossing bus support apparatus of the present invention is used in two halves, each with connectors having interlockable features. Bus spacing is maintained and the use of two halves with interlockable connectors enables connection to each other easily and firmly without involving additional fasteners. Furthermore, the crossing bus supports may be assembled after the crossing buses are installed and in place in the enclosure box.

Because of the typical order of crossing buses in the enclosure box (e.g., A, N, B, and C), the connectors on each end of the crossing bus supports may be designed to be symmetrical relative to a center plane thereof. In particular, the crossing bus support apparatus includes a body structure having a first portion with a plurality of phase bus slots arranged along a first direction extending from a first end to a second end, the phase bus slots adapted to receive a plurality of crossing buses; a first connector on the first end having interlockable features; and a second connector on the second end having interlockable features. The interlockable feature of the connectors may include interlockable shapes, such as serrations.

Second and third portions may project from the first portion and may include the interlockable connectors at terminal ends thereof. The connectors may have protrusions extending from the second and third portions, wherein the protrusions may include serrations or teeth on opposite side surfaces enabling local interlocking at each end.

Several embodiment variations are described herein. One embodiment may include rounded corners for fitting into enclosure boxes having a rectangular cross-section. Another embodiment may have an extended mounting foot (e.g., a mounting tab) adapted to facilitate mounting of the crossing bus support apparatus and crossing buses to a back surface of an enclosure box.

As will become apparent, the crossing bus support apparatus of the present invention advantageously enables the ability to rapidly assemble the crossing buses within an enclosure box.

These and other embodiments of crossing bus support apparatus, connectors, crossing bus support assemblies, crossing bus assemblies, electrical system subcomponents, and methods of installing the present invention are described below with reference to FIGS. 3A-11. The drawings are not necessarily drawn to scale.

Referring now in specific detail to FIG. 3A-3F, a crossing bus support apparatus 300 is shown. The crossing bus support apparatus 300 will be referred to herein as a "crossing bus support apparatus" or "crossing bus support" or "bus support" or just "support." The crossing bus support apparatus 300 may be a half of a crossing bus support assembly (e.g., 400, 600) as will become apparent when describing FIGS. 4A-4B and FIGS. 6A-6B herein.

The crossing bus support apparatus 300 may include a body structure 302 with a first portion 304 having a crossing bus spacing structure formed therein, such as multiple phase bus slots 306 arranged in the body structure 302 along a first direction 308. The first direction extends from a first end 310 to a second end 312. The phase bus slots 306 are adapted to receive and constrain a plurality of crossing buses 706 therein (See FIG. 7).

The crossing bus support apparatus 300 includes a first connector 314 on the first end 310; the first connector 314 having interlockable features 315. A second connector 316 is included on the second end 312, also having interlockable features 317. The first and second connectors 314, 316 are preferably identical to each other in structure, but provided in an inverted orientation relative to one another as shown in FIG. 3A.

The crossing bus support apparatus 300 may have a "C-shaped" structure. At each end 310, 312 of the crossing bus support apparatus 300, second portion 318 and third portion 320 may extend outwardly from the first portion 304 along second and third directions 322, 324, respectively which are different that the first direction 308. The portions 318, 320 may be symmetrical projecting protrusions extending generally perpendicularly out from the first portion 304, and may have a T-beam cross-sectional shape. Other cross sectional shapes may be used. Each of the second and third portions 318, 320 may include the connectors 314, 316 located at a terminal ends thereof. The connectors 314, 316 may each include the afore-mentioned interlockable features 315, 317, and preferably, two or more interlockable features may be provided on each.

In some embodiments, the interlockable features 315, 317 may each be included on two protrusions. The protrusions may be diagonally-opposed features and the interlockable features 315, 317 may be serrations (e.g., teeth). The interlockable features 315, 317 may face (e.g., have points facing) in opposite directions. The serrations are adapted to be interlockable with other like features on another crossing bus support apparatus to form a crossing bus support assembly 400, 600B (See FIGS. 4A-4B and 6B, for example). In some embodiments, the crossing bus support apparatus which is interlockable with the crossing bus support apparatus 300 may be identical to crossing bus support 300. For example, they may be manufactured by molding in a same or virtually identical mold.

The crossing bus support apparatus 300 can be interlocked together with another side-by-side flipped crossing bus support apparatus by interlocking opposite serrations (e.g., teeth) to form a crossing bus support assembly (e.g., 400, 600B) adapted to support crossing buses (e.g., 706). The crossing bus support assembly 400, 600B may have sufficient strength to withstand the forces of short circuit interruption. The connector design including multiple protrusions with interlockable features (e.g., serrations or teeth) may also be used for joining of other objects, such as extending ropes, rods, threaded rods, etc. as will be described further below in relation to FIG. 10.

The crossing bus support apparatus 300 may also include side support wings 326. The side supporting wings 326 may surround the body structure 302, reinforce the crossing bus support 300, and define an external boundary of the crossing bus support 300 so that the side surfaces of the first, second, and third portions 304, 318, 320 keep sufficient electrical spacing from live parts (crossing buses) and the metal of the enclosure box that the crossing buses are housed/installed within. The side support wings 326 may be molded ribs having a thickness "Ts" which is less than an overall thickness "To" of the crossing bus support 300 (See FIG. 3F). The thickness Ts may be about 3 mm, for example, whereas the thickness To may be about 19 mm. Other suitable thicknesses may be used. The support wings 326 may have a height that extends out from the thicker portion of the body 302 by about 12 mm. Other heights may be used.

In some embodiments, the body structure 302 may include rounded corners and/or reliefs 328, which may be formed on the wings 326. The rounded corners and/or reliefs 328 may provide clearance for any obstacle or structure (e.g., welds, tabs, screws, wire, etc.) that may be provided in the corners of the enclosure box into which the crossing bus support 300 is installed. Indicia, such as phasing identification letters A, N, B, C may be provided on the side wings 326 to identify/match with phase bus slots 306 and may indicate crossing phase bus layout, as well as part direction. Further indicia, such as part numbering or other part identifiers, may be provided on the side wings 326.

The spacing of the phase bus slots 306 may be optimized per industry standards (e.g., UL-67). The phase bus slots 306 may each have a width "W" sufficient to constrain the crossing buses. For example, the width "W" may be roughly the same as the thickness of crossing bus that is received therein, or slightly larger. The depth "D" of the phase bus slots 306 may be configured so that the slots 306 are sufficiently deep enough to withstand rush forces generated during short circuit interruption and thereby retain the crossing buses in the slots 306. The phase bus slots 306, for example, may have a width "W" of about 7 mm, and a depth "D" of about 10 mm. Other suitable widths and depths may be used depending upon the thickness and width of the crossing buses. The crossing bus support apparatus 300 may be manufactured from a suitable plastic material, such as a thermoplastic material, such as Modified Polyphenylene Ether. Asahi Xyron 540V material available from Asahi Chemicals has been found to be a good material for molding of the crossing bus support apparatus 300. Other flame retardant plastic materials may be used.

The phase bus slots 306 may be spaced out and formed by intervening walls 330 on either side of each slot 306. The spacing may be as provided by UL-67 code. For example, the A-N, and N-B spacing may be about 22 mm from slot center to slot center, whereas the B-C spacing may be about 30 mm from slot center to slot center. Various cavities 332 adjacent to the walls 330 may be provided to remove excess material and increase the surface area in an electrical path between the respective adjacent slots 306. The cavities 332 may be formed into the body structure 302 of the first portion 304 between the slots 306 and in from both sides thereby forming an internal web which is thinner than the overall thickness of the body structure 302. The cavities 332 may be square, rectangular, circular, or other shapes. The body structure 302 may include an opening slot 334 between each of the adjacent phase bus slots 306, which may extend into, and intersect with, the web formed by the respective cavities 332. Including the opening slots 334 also extends the electrical surface spacing between adjacent slots 306.

As mentioned above, at both the first and second ends 310, 312 of the body structure 302, suitable connectors 314, 316 may be provided. Each connector 314, 316 may include interlockable features 315, 317, such as serrations. The connectors 314, 316 may include a structure that is symmetrical to a center plane (shown as a phantom line "P") of the body structure 302. Each pair of connectors 314, 316 may have two diagonally-opposed projecting protrusions. For example, connector 314 may include first protrusion 336 and second protrusion 338. The connector 314 may extend from the second portion 318 along the second direction 322. Likewise, for example, connector 316 may include third protrusion 340 and fourth protrusion 342. Connector 316 may extend from the third portion 320 along the third direction 324. First and third protrusions 336, 340 may be aligned vertically. Likewise, second and fourth protrusions 338, 342 may be aligned vertically. The protrusions 336, 338 may be co-extensive and project alongside each other in a generally parallel orientation along the direction 322. The protrusions 340, 342 may be co-extensive and project alongside each other in a generally parallel orientation along the direction 324. Directions 322, 324 may be parallel so that connection to other supports is enabled.

The connectors 314, 316 will now be described more fully with reference to FIGS. 3A-3C. Connector 316 may, in some embodiments, be identical to connector 314, except for orientation to the second and third portions 318, 320. The outer (e.g., upper) side of the first protrusion 336 and inner (e.g., lower) side of the second protrusion 338 may include one or more interlockable features 315 on surfaces thereof, such as opposite-facing serrations (e.g., teeth), respectively, so that they could be interlocked with other like interlockable features of a mating support (see FIG. 4A, FIG. 6B). The serrations may number 2, 3, 4, 5, 6, 7, 8, 9, 10 or more. Including about 9 serrations per surface has proven effective. Similarly, the outer (e.g., lower) side of the third protrusion 340 and inner (e.g., upper) side of the fourth protrusion 342 may include one or more interlockable features 317 on surfaces thereof, such as opposite-facing serrations (e.g., teeth), respectively, so that they could be interlocked with other like interlockable features of a mating support (see FIG. 4A, FIG. 6B). Thus, it should be recognized that each connector 314, 316 may include interlockable features that may include a face on one protrusion with serrations that face in one direction, and a face on another protrusion with serrations that face in an opposite direction. Thus, each connector 314, 316 at each end 310, 312 has the ability of providing a secure snap-fit interlockable connection at that end irrespective of the other end or the flexing of the first portion 304.

Additionally, as can be seen from FIG. 3A, one set of the serrations 315, 317 on protrusions 336 and 340 face away from one another, whereas another set of the serrations 315, 317 on protrusions 338, 342 face towards each other. Thus, in addition to the snap-fit connection provided at each end 310, 312, a contribution to the connection strength is achieved through the interaction of protrusions 336, 340 with like protrusions on another interlocking crossing bus support, i.e., from end to end.

In addition to the one or more serrations on the upper and lower surfaces of protrusions 336, 338, one or more additional interlockable features may be provided. For example, the additional interlockable features may be provided on sidewalls 344 of the protrusions 336, 338 (See FIG. 3C). For example, one or more additional interlockable features (e.g., a plurality of vertically-oriented ribs 345 and 346) may be provided on each sidewall 344. The ribs 345, 346 may face in opposite directions for locking the support 300 and an interlocking support together to form a crossing bus support assembly. As can be seen from FIG. 3F, one or more interlockable features (e.g., ribs 345, 346) may be located on a first sidewall of the protrusion 342. Likewise, protrusion 340 may include like additional interlockable features (e.g., ribs 345, 346) on a sidewall facing the first sidewall 344. The ribs 345 may be offset from one another along the lengths of protrusions 340, 342. Likewise, ribs 346 may be offset from one another along the lengths of protrusions 340, 342. In this manner, ribs 345, 346 may mate with associated ribs 345, 346 of another support including a connector like on support 300 to provide additional connection strength. The other connector 316 may include like additional interlocking features. An orientation of features may be switched. The sidewalls (e.g., 344) may be provided in an approximately perpendicular orientation to a plane of the interlockable features 315.

Figure 4A:
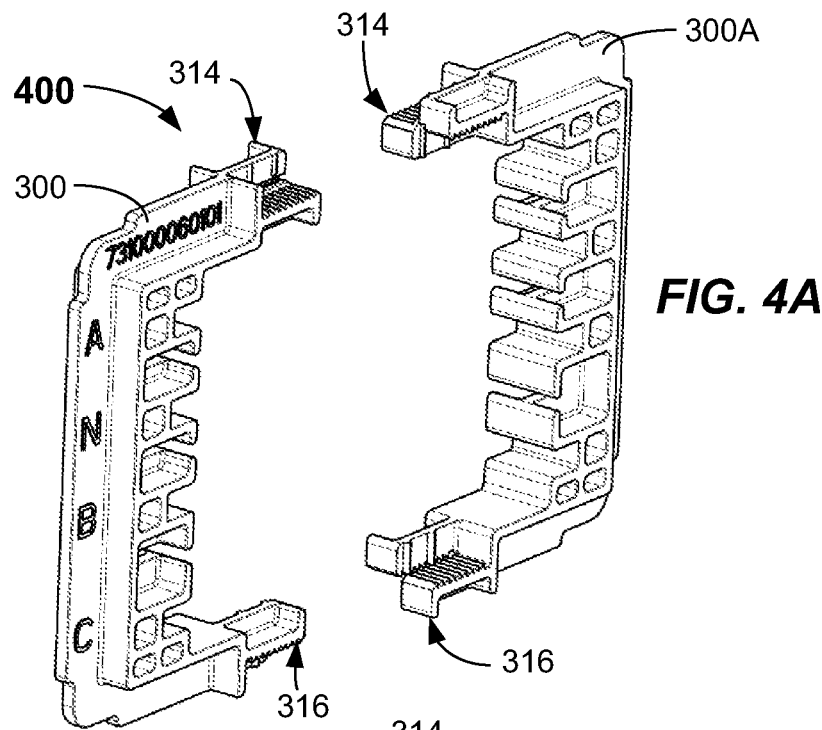
FIGS. 4A-4B are perspective views of an embodiment of a crossing bus support assembly shown disconnected (FIG. 4A) and connected (FIG. 4B) according to embodiments of the present invention.
Figure 4B:
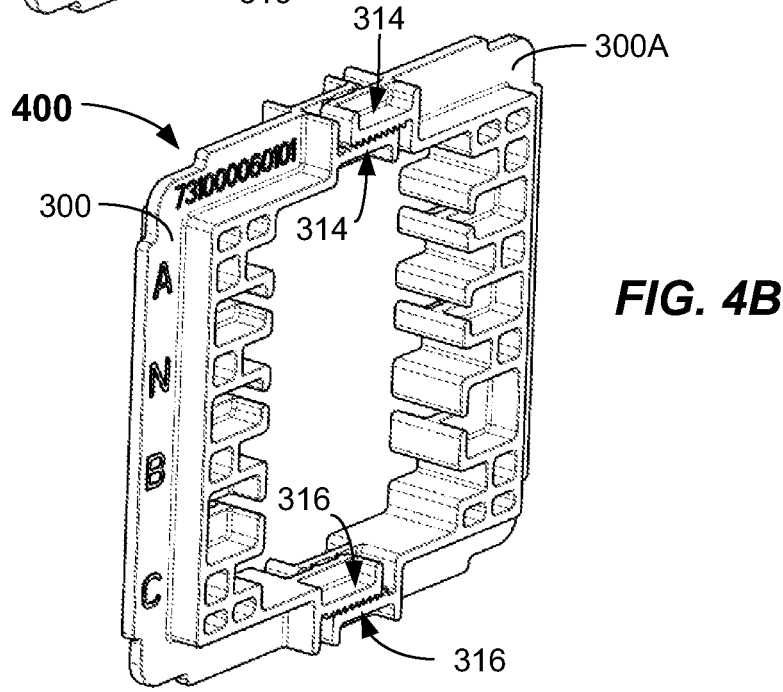
Figure 7:
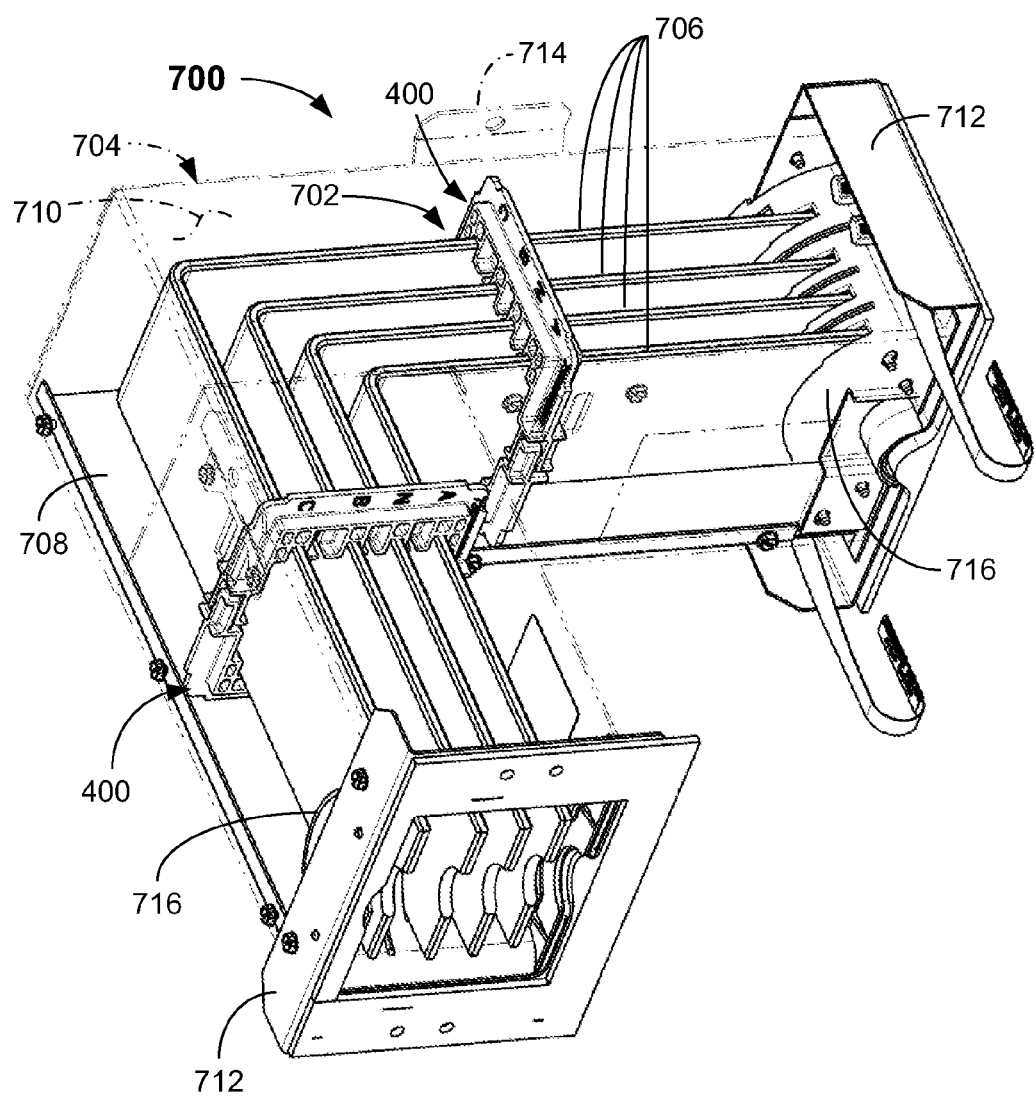
FIG. 7 is a perspective view of an inside corner crossing bus extension enclosure box shown with a crossing bus assembly installed therein.

FIGS. 4A-4B illustrate an embodiment of a crossing bus support assembly 400 in a disconnected configuration (FIG. 4A) and an interconnected configuration (FIG. 4B). The assembly 400 may be comprised of a first support 300 and a second support 300A adapted to be interconnected with one another. Support 300A may be identical to support 300. As shown, connectors 314, 316 of support 300 interconnect with connectors 314, 316 of support 300A. The crossing bus support assembly 400 has a compact size and may receive, hold, and retain the crossing buses within the respective opposing phase bus slots thereof. Hence, the crossing bus support assembly 400 may bundle the crossing buses together, and may optimally space them apart. Together, the crossing bus support assembly 400, and the crossing phase buses form a crossing bus assembly as is shown in FIG. 7, for example. The crossing bus support assembly 400 including interconnected supports 300 may have sufficient joint strength to withstand high interrupting forces encountered during short circuit events and yet may be easily assembled to the crossing busses.

FIGS. 5A-5F illustrates another embodiment of crossing bus support 500 with a mounting extension 550. All of the other structure and features are identical to the FIG. 3A-3F embodiment and will not be repeated here. With the mounting extension 550, the crossing bus support 500 may be mounted onto an enclosure box at a designated location (See FIGS. 8 and 9). The mounting extension 550 may include a mounting hole 551 adapted to receive a fastener (e.g., a screw). Optionally, other types of fasteners may be employed, such as an integrally molded snap-fit connector on the mounting extension that may be mounted to a hole in the enclosure box. In the depicted embodiment, the top surface 552 of the mounting extension 550 may be flat and parallel to the back surface of the mounting extension 550 that is intended to mate with the wall of the enclosure box. Ribs 554 and cutoff 556 may be included and may be designed to avoid undercut in a mold adapted for the manufacture of the mounting hole 551.

Figure 6A:
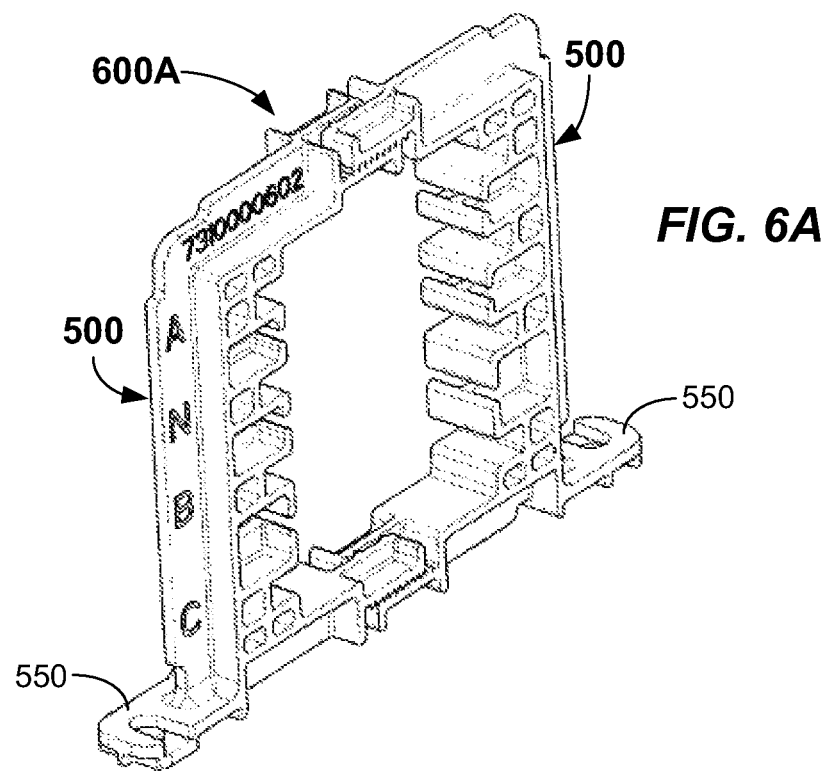
FIGS. 6A-6B are perspective views of two embodiments of crossing bus support assemblies according to embodiments of the present invention.
Figure 6B:
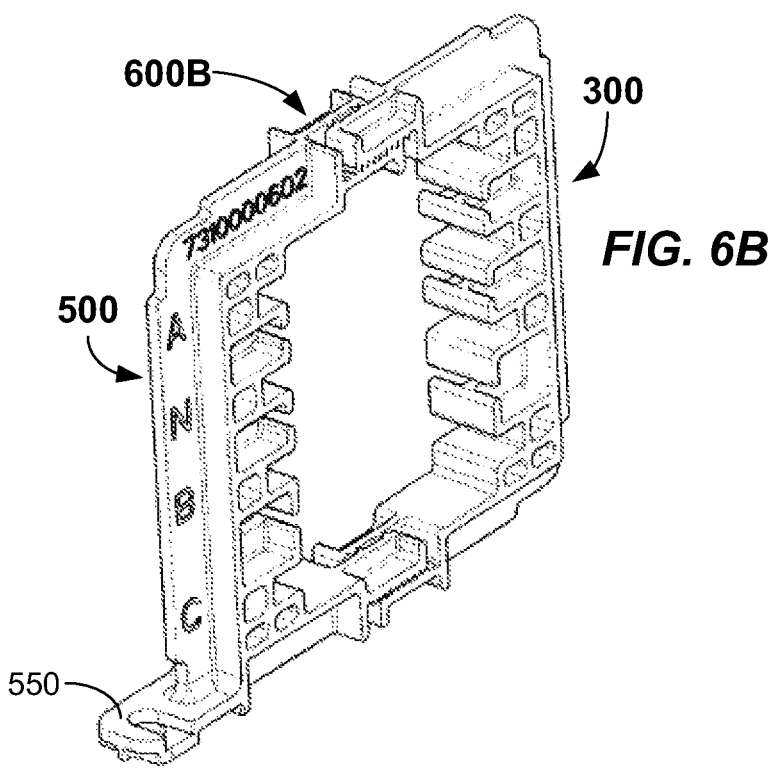

FIGS. 6A-6B illustrate crossing bus support assemblies 600A, 600B including various combinations of crossing bus supports 300 and 500. FIG. 6A illustrates an assembly 600A including two interconnected crossing bus supports with mounting extensions 550. The crossing bus support assembly 600A may be used on an enclosure box where the crossing buses need to be supported and located in a predefined location within the enclosure box. For example, the crossing buses may be supported by only the crossing bus support assembly 600A.

FIG. 6B illustrates an assembly 600B including two interconnected crossing bus supports, wherein one support 500 includes a mounting extension 550, and the other support 300 does not include a mounting extension. The crossing bus support assembly 600B with one mounting extension 550 may be used in enclosure boxes where the crossing buses may need extra support. Such support assemblies 600A, 600B may interface with an enclosure box at a defined location, which may include a pre-established mounting hole or holes.

FIG. 7 illustrates an electrical system subcomponent 700 including a crossing bus assembly 702 installed into an enclosure box 704. Portions of the enclosure box 704 are shown in phantom lines for clarity. The enclosure box 704 may be a Power Mod™ internal cornering bus extension box or the like, for example. In this embodiment, the enclosure box 704 is an extension box that is adapted to extend a plurality of crossing buses 706 e.g., L-shaped crossing buses) around a corner in an electrical room and make an electrical connection to another electrical subcomponent. However, as used herein, the term "enclosure box" is intended to include any structural component having an interior into which the crossing bus assembly 702 may be received, connected, and/or assembled. The enclosure box 704 may be of any suitable shape or size for housing the crossing bus assembly 702, or the crossing bus assembly 702 and other electrical components (switches, meters, circuit breakers, etc.).

The electrical system subcomponent 700 may include enclosure halves or portions (e.g., a bottom 708 and a top 710—top 710 is shown in phantom for clarity), end interfaces 712, mounting brackets 714, crossing buses 706, and one or more crossing bus support assemblies (e.g., 400). The crossing bus support assemblies 400 may be received in between the top and bottom enclosure halves 710, 708, and may be provided in a configuration to support and hold around (e.g., surround) the crossing buses 706. The crossing bus supports 400 and the bus spacers 716 are adapted to keep the crossing buses spaced appropriately. In the depicted embodiment, one crossing bus support 400 is provided on either side of the corner. Therefore, both crossing bus supports 400 may function to support and constrain the angled crossing buses 706 from moving inside the enclosure box 704.

Figure 8:
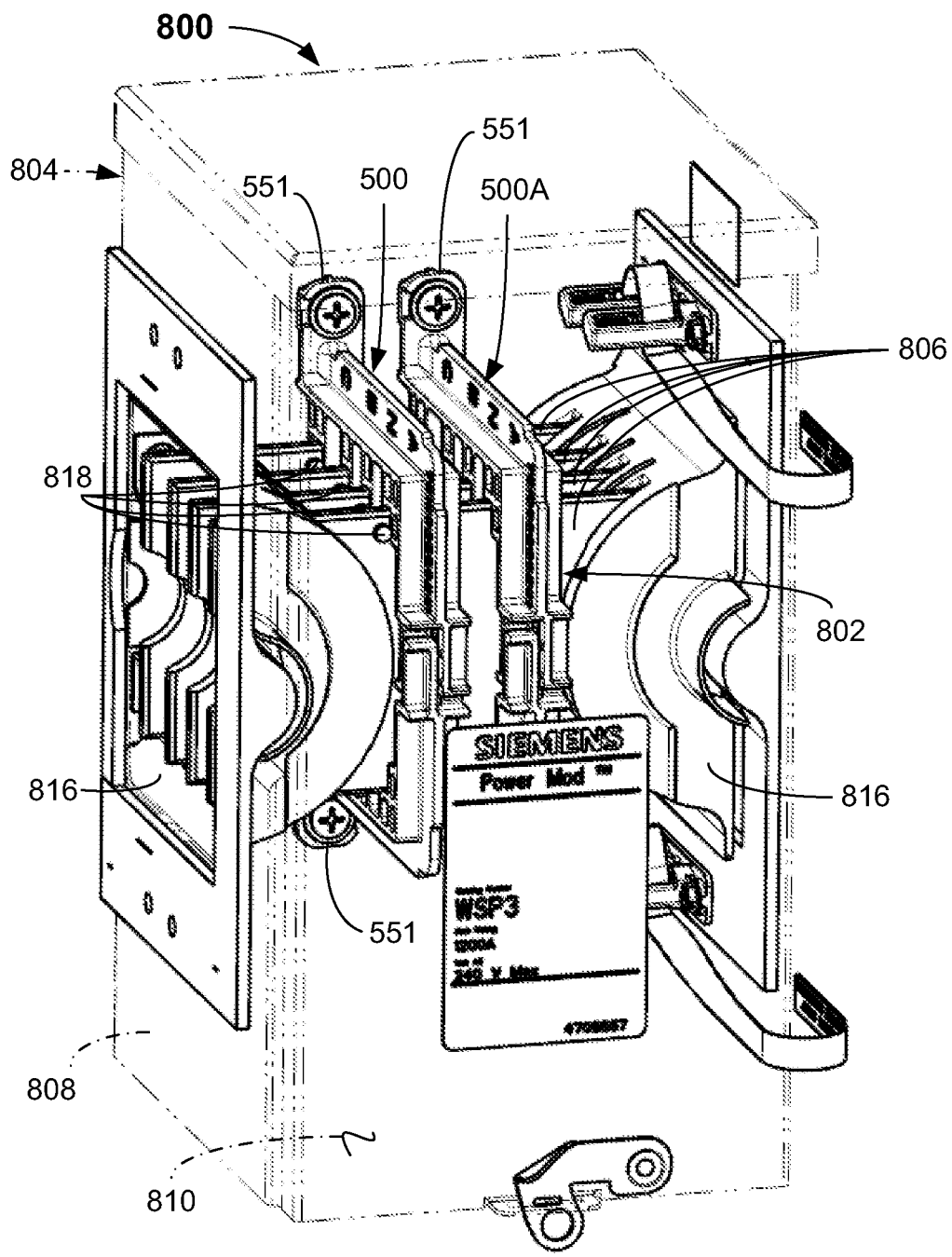
FIG. 8 is a perspective view of a crossing bus extension enclosure box shown with a crossing bus assembly installed therein.

FIG. 8 illustrates another electrical system subcomponent 800 including a crossing bus assembly 802 installed into an enclosure box 804 (shown in phantom lines for clarity). The enclosure box 804 may be a Power Mod™ Bus Extension Box, which may act as a spacer between other enclosure boxes such as other Power Mod™ modules, for example. In this embodiment, the enclosure box 804 is adapted to enclose the crossing buses 806 and make an electrical connection between other electrical subcomponents. The base 808 and cover 810 (both shown in Phantom) of the enclosure box 804 may enclose the crossing buses 806 that are spaced and supported by two crossing bus support assemblies 500, 500A and crossing bus spacers 816 at either ends of the crossing buses 806. The two crossing bus support assemblies 500, 500A may each include two mounting extensions 551 (as described in FIG. 5A-5B) that may be mounted onto a back surface of the enclosure box 804 by suitable fasteners (e.g., screws). The crossing buses 806 may include locating features 818 which may be protrusions, inserts or half shear members formed on one or more surfaces of each of the crossing buses 806 at a location adjacent to the phase bus slots 506 (FIG. 5B). The locating features 818 may be provided on each of the crossing bus supports at two locations, one on a left side of the support apparatus 500, and one on a right side (not shown) of the support apparatus 500A. In this way, the locating features 818 may prevent the crossing buses 806 from moving (sliding sideways) along the phase bus slots 506 of the two crossing bus support apparatus 500, 500A due to interference there between.

Figure 9:
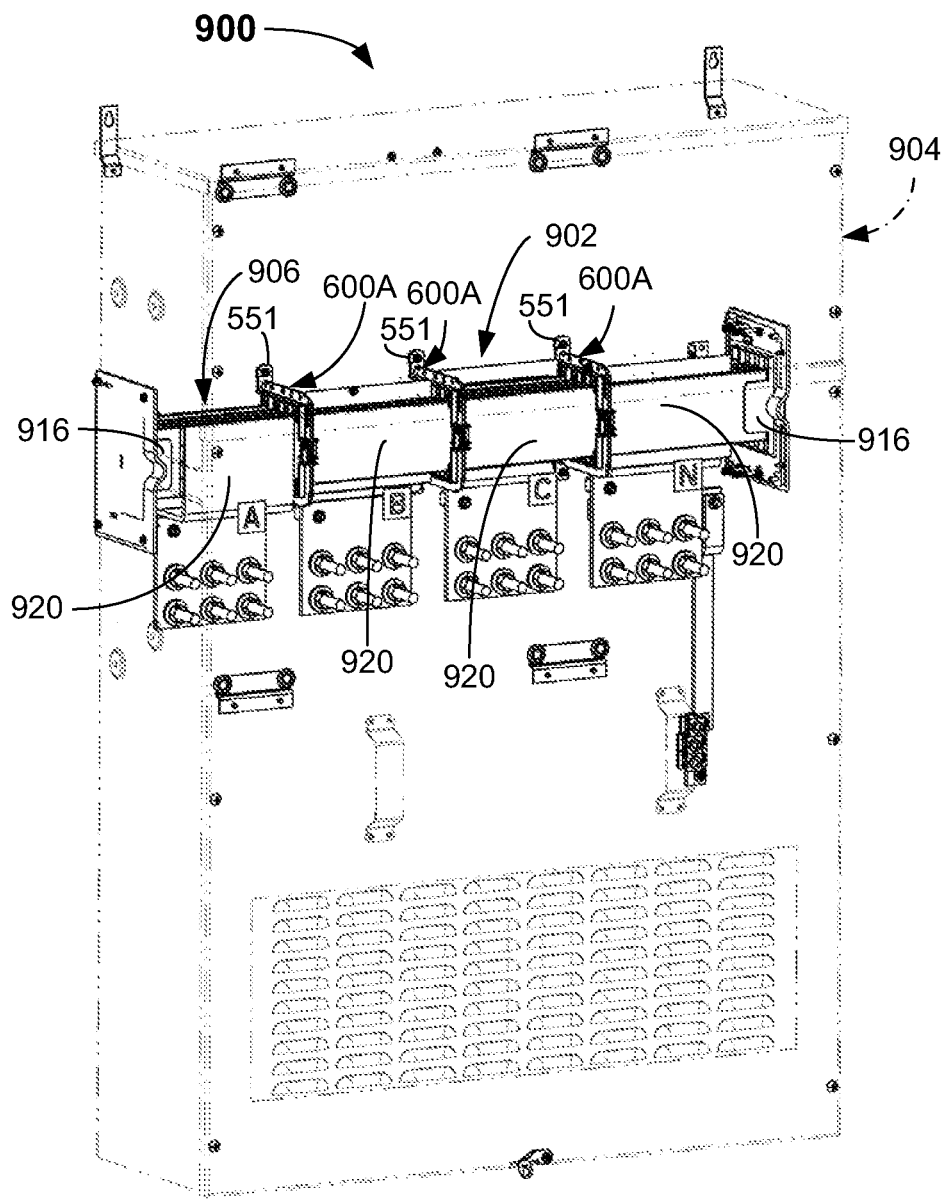
FIG. 9 is a perspective view of another crossing bus enclosure box shown with a crossing bus assembly installed therein.
Figure 10:
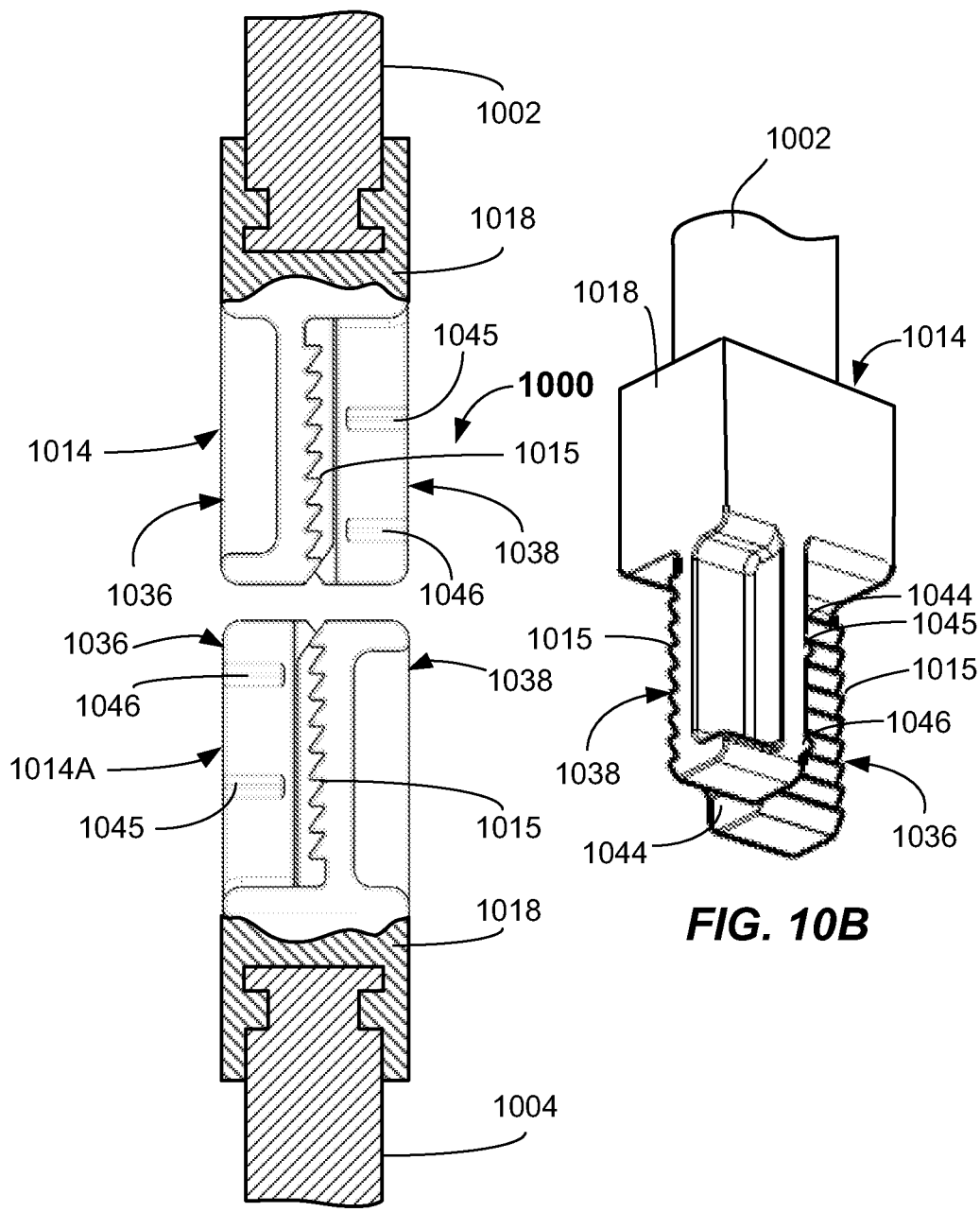
FIG. 10A is a plan view of a connector assembly (shown in a disconnected configuration) according to an aspect of the invention.
FIG. 10B is a perspective view of a connector of FIG. 10A according to embodiments of the present invention.

FIG. 9 illustrates another electrical system subcomponent 900 including a crossing bus assembly 902 installed into an enclosure box 904 (shown in phantom lines for clarity). The enclosure box 904 may be a Power Mod™ Tap Box, which may receive various electrical components, for example. In this embodiment, the enclosure box 904 is adapted to enclose a plurality of crossing buses 906. The enclosure box 904 may enclose the crossing buses 906 that are spaced and supported by one or more (e.g., one, two, three, or more) crossing bus support assemblies 600A and crossing bus spacers 916 at either end of the crossing buses 906. The crossing bus support assemblies 600A may include mounting extensions 551 (as described in FIG. 5A) that may be mounted onto a back surface of the enclosure box 904 by suitable fasteners (e.g., screws). The electrical system subcomponent 900 may include covers 920 over the crossing buses 906 at various locations, such as between the support apparatus 600A. The covers 920 may serve to appropriately space the support assemblies 600A and to provide a suitable electrical insulation shield over the crossing buses 906.

FIGS. 10A-10B illustrate, in another broad aspect, another application of an interlockable connector 1014 and connector assembly 1000 according to the present invention (shown in a disconnected configuration for clarity). In particular, in the assembly 1000, a first object 1002 may be joined to a second object 1004 by the connector assembly 1000. The interlockable connectors 1014, 1014A may be coupled to the first and second objects 1002, 1004 via molding, adhesive bonding, or mechanical connection via fasteners (bolts, screws), threading, crimps, press fit, or the like. In the depicted embodiment, the connectors 1014, 1014A are molded to the objects 1002, 1004. The objects 1002, 1004 may be rods, beams, shafts, cables, ropes with solid ends, or other objects to be joined. In the case of cable and ropes, the objects 1002, 1004 may be the respective ends of the cables or ropes, for example. The interlockable connector 1014, 1014A may be used for connecting a drive shaft to a motor. For example, a threaded beam drive may be connected by the coupling to a motor of a garage door opener, for example. The structure of the connectors 1014, 1014A with interlockable features may be the same as was before described with reference to FIGS. 3A-3F. In some embodiments, the connectors 1014, 1014A may interconnect the objects 1002, 1004 such that a torque may be transmitted there between, for example.

As discussed above, each connector 1014, 1014A may include protrusions 1036, 1038 which may extend in a generally same direction (i.e., they are co-extensive in that they extend in generally parallel relationship to one another) from member bodies 1018 that are coupled to the objects 1002, 1004. The interlockable features 1015 may include serrations, such as interlockable teeth formed on respective surfaces of the protrusions 1036, 1038. The surfaces on which the interlockable features 1015 are included may be generally-opposed surfaces. Furthermore, the surfaces may be offset from one another so that a normal projection of a circumscribed area of the surfaces do not overlap. In other words, the surfaces do not lay one over the top of the other. Additionally, generally-opposed side surfaces 1044 of the protrusions 1036, 1038 may also include additional interconnecting features 1045, 1046, such as the two ribs shown. As described above, the ribs on each protrusion may be offset from one another along the length of each protrusion 1036, 1038.

Figure 11:
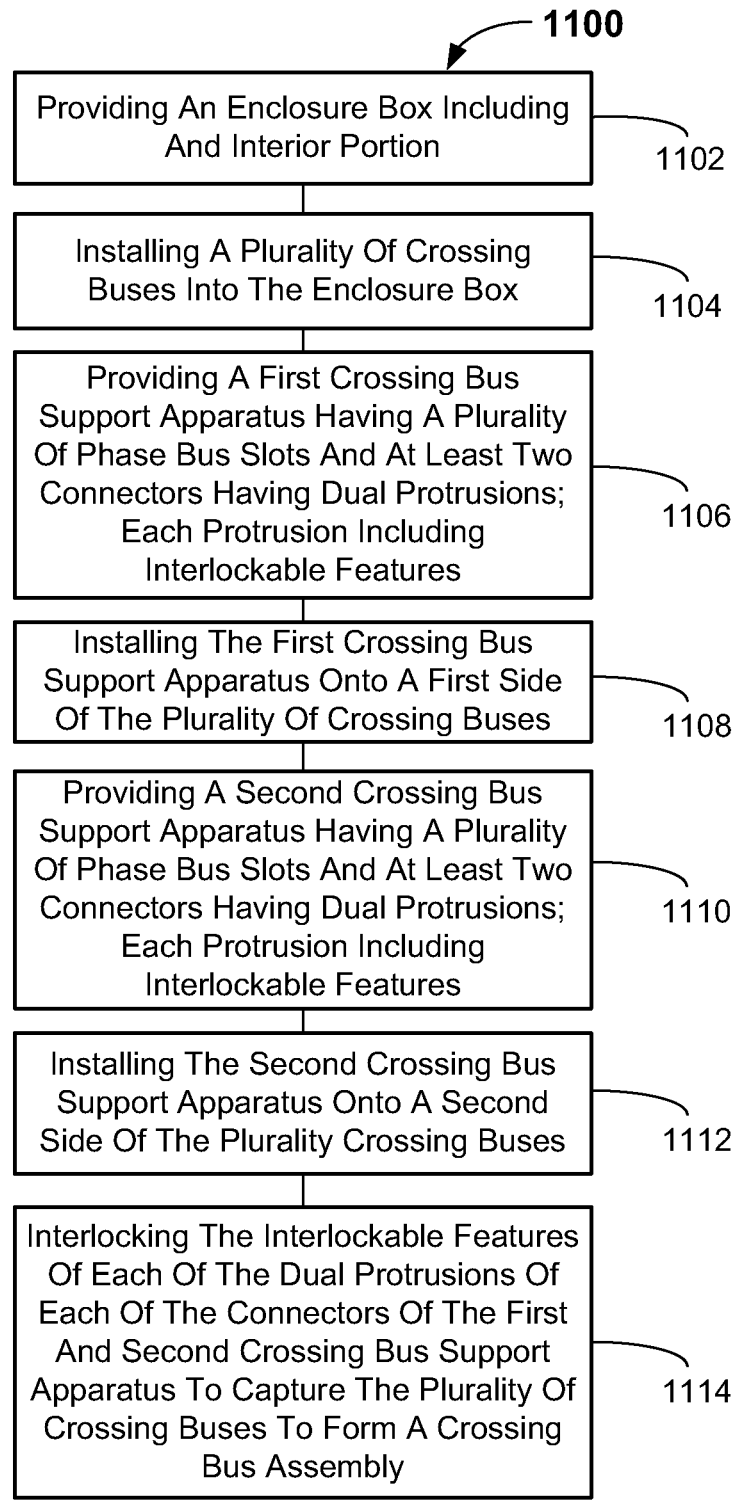
FIG. 11 is a flowchart illustrating a method of installing crossing bus support apparatus according to embodiments of the invention.

FIG. 11 is a flowchart illustrating a method of installing a crossing bus support apparatus (e.g., 300, 500) according to an aspect of the present invention. The method 1100 includes providing an enclosure box including an interior portion in 1102, installing a plurality of crossing buses into the enclosure box in 1104, providing a first crossing bus support apparatus having a plurality of phase bus slots and at least two connectors having dual protrusions each protrusion including interlockable features in 1106, installing the first crossing bus support apparatus onto a first side of the plurality of crossing buses in 1108, providing a second crossing bus support apparatus having a plurality of phase bus slots and at least two connectors having dual protrusions each including protrusion including interlockable features in 1110, installing the second crossing bus support apparatus onto a second side of the plurality of crossing buses opposite the first side in 1112, and interlocking the interlockable features of each of the dual protrusions of each connectors of the first and second crossing bus support apparatus to form a crossing bus assembly in 1114. This effectively constrains and spaces the plurality of crossing buses within the enclosure box.

While the invention is susceptible to various modifications and alternative forms, specific embodiments and methods thereof have been shown by way of example in the drawings and are described in detail herein. It should be understood, however, that it is not intended to limit the invention to the particular apparatus, systems, or methods disclosed, but, to the contrary, the intention is to cover all modifications, equivalents and alternatives falling within the spirit and scope of the invention.

What is claimed is:

1. A crossing bus support apparatus, comprising:
   a body structure including
      a first portion having a plurality of phase bus slots arranged along a first direction extending from a first end to a second end, the phase bus slots adapted to receive a plurality of crossing buses;
      a first connector on the first end having a first protrusion and a second protrusion each having interlockable features; and
      a second connector on the second end having a third protrusion and a fourth protrusion each having interlockable features.

2. The crossing bus support apparatus of claim 1, further comprising:
   a second portion extending in a second direction from the first portion at the first end, the second direction different than the first direction, wherein the first connector is located at a terminal end of the second portion; and
   a third portion extending in a third direction from the first portion at the second end, the third direction different than the first direction, wherein the second connector is located at a terminal end of the third portion.

3. The crossing bus support apparatus of claim 2, wherein the connectors on each of the second and third portions are adapted to couple to identical connectors on another crossing bus support apparatus.

4. The crossing bus support apparatus of claim 2, wherein interlocking features include serrations formed on surfaces of the first, second, third, and fourth protrusions.

5. The crossing bus support apparatus of claim 2, wherein the interlocking features formed on the first protrusion are formed on an opposite sides of the first connector from the interlocking features formed on the second protrusion.

6. The crossing bus support apparatus of claim 2, wherein the interlocking features formed on the third protrusion are formed on an opposite sides of the second connector from the interlocking features formed on the fourth protrusion.

7. The crossing bus support apparatus of claim 1, further comprising phasing identification indicia marked on a support wing of the first portion adjacent to one or more of the phase bus slots.

8. The crossing bus support apparatus of claim 1, further comprising a second portion and a third portion extending from the first portion, wherein each of the second portion and the third portion including support wings, wherein at least one of the support wings includes part identification.

9. The crossing bus support apparatus of claim 1, further comprising a mounting extension extending from the first portion.

10. The crossing bus support apparatus of claim 1, further comprising interlockable features provided on side surfaces of the first and second protrusions.

11. A crossing bus support apparatus, comprising:
    a body structure including
       a first portion having a plurality of phase bus slots arranged along a first direction extending from a first end to a second end, the phase bus slots adapted to receive a plurality of crossing buses;
       a first connector on the first end having a first protrusion and a second protrusion each having interlockable features; and
       a second connector on the second end having a third protrusion and a fourth protrusion each having interlockable features, further comprising a support wing including a rib extending along the first portion, the rib adapted to provide spacing between cross buses and an enclosure receiving the cross buses.

12. The crossing bus support apparatus of claim 11, further comprising a second portion and third portion each extending from the first portion, and a rib extending along at least a portion of each of the second portion and third portions, the ribs adapted to provide spacing between cross buses and an enclosure receiving the cross buses.

13. A crossing bus support assembly, comprising:
    a first crossing bus support having a body structure including:

a first portion including a plurality of phase bus slots arranged along a first direction, the phase bus slots adapted to receive a plurality of crossing buses, and second and third portions extending from the first portion along a direction different than the first direction, each of the second and third portions having a connector with dual projections, each projection including an interlockable feature; and a second crossing bus support having a body structure including:

a first portion including a plurality of phase bus slots arranged along a first direction, the phase bus slots adapted to receive the plurality of crossing buses, and second and third portions extending from the first portion along a direction different than the first direction, each of the second and third portions having a connector with dual projections, each projection including an interlockable feature which is adapted to interlock with the interlockable features of the first crossing bus support.

14. A crossing bus assembly, comprising:

a plurality of crossing buses; and one or more crossing bus support assemblies coupled to the crossing buses, the crossing bus support assembly including interconnected crossing bus supports, wherein each of the crossing bus supports includes:

a first portion including a plurality of phase bus slots arranged along a first direction, the phase bus slots receiving a side of the plurality of crossing buses, and second and third portions extending from the first portion along a direction different than the first direction, each of the second and third portions having a connector with dual projections, each projection including an interlockable feature.

15. An electrical system subcomponent, comprising:

an enclosure box;

a plurality of crossing buses provided in the enclosure box; and one or more crossing bus support assemblies coupled to the plurality of crossing buses, the crossing bus support assemblies including interconnected crossing bus support apparatus, and wherein each of the crossing bus support apparatus includes:

a first portion having a plurality of phase bus slots arranged along a first direction, each of the phase bus slots receiving one of the plurality of crossing buses, and second and third portions extending from the first portion along a direction different than the first direction, each of the second and third portions having a connector with dual projections, each projection including an interlockable feature.

16. The electrical system subcomponent of claim 15, wherein the connectors on each of the second and third portions is coupled to an identical coupling on another crossing bus support apparatus.

17. A method of installing crossing buses, comprising:

providing an enclosure box including an interior portion;

providing a plurality of crossing buses in the enclosure box;

providing a first crossing bus support apparatus having a plurality of phase bus slots and at least two connectors having dual protrusions each connector including interlockable features;

installing the first crossing bus support apparatus onto a first side of the plurality of crossing buses;

providing a second crossing bus support having a plurality of phase bus slots and at least two connectors having dual protrusions each connector including interlockable features;

installing the second crossing bus support apparatus onto a second side of the plurality of crossing buses; and interlocking the interlockable features of each of the dual protrusions of each connector of the first and second crossing bus supports apparatus to capture the plurality of crossing buses and form a crossing bus assembly.

18. The method of claim 17, further comprising installing the crossing bus assembly into an enclosure box.

19. A connector, comprising:

an object;

a body structure coupled to the object;

a first protrusion extending from the body structure, the first protrusion including interlocking features formed on a first surface thereof;

a second protrusion extending from the body structure alongside of the first protrusion, the second protrusion including interlocking features formed on a second surface opposite the first surface; and either the first protrusion or the second protrusion, or both, further including a sidewall having vertically-oriented ribs.

* * * * *